United States Patent
Beier

(10) Patent No.: US 10,570,791 B2
(45) Date of Patent: Feb. 25, 2020

(54) JET ENGINE DEVICE WITH AT LEAST ONE COMPONENT THAT IS ARRANGED IN A CASING AND THAT IS ROTATABLE TO THE CASING

(71) Applicant: Rolls-Royce Deutschland Ltd & Co KG, Blankenfelde-Mahlow (DE)

(72) Inventor: Juergen Beier, Schulzendorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 1259 days.

(21) Appl. No.: 14/570,423

(22) Filed: Dec. 15, 2014

(65) Prior Publication Data
US 2015/0176447 A1 Jun. 25, 2015

(30) Foreign Application Priority Data
Dec. 20, 2013 (DE) .......................... 10 2013 114 638

(51) Int. Cl.
| | | |
|---|---|---|
| F01M 13/04 | (2006.01) | |
| F02C 7/32 | (2006.01) | |
| F01D 25/18 | (2006.01) | |
| F02C 7/06 | (2006.01) | |

(Continued)

(52) U.S. Cl.
CPC ............ F01M 13/04 (2013.01); F01D 25/18 (2013.01); F02C 7/06 (2013.01); F02C 7/32 (2013.01); *B01D 45/12* (2013.01); *F01M 2013/0422* (2013.01); *F16N 7/32* (2013.01)

(58) Field of Classification Search
CPC ... F01D 25/18–25/20; F02C 7/32; F02C 7/06; F01M 13/04; F01M 2013/0422; F16N 7/32; B01D 45/12
See application file for complete search history.

(56) References Cited

U.S. PATENT DOCUMENTS

| | | | |
|---|---|---|---|
| 3,415,383 A * | 12/1968 | Earle, Jr. ................... | B04B 1/04 210/167.02 |
| 4,525,995 A | 7/1985 | Clark | |
| 4,775,103 A | 7/1988 | Streifinger | |

(Continued)

FOREIGN PATENT DOCUMENTS

| | | |
|---|---|---|
| DE | 3605619 A1 | 8/1987 |
| DE | 69605014 | 5/2000 |

(Continued)

OTHER PUBLICATIONS

European Search Report dated May 5, 2015 for related Application No. 14196987.3.

(Continued)

*Primary Examiner* — Kenneth Bomberg
*Assistant Examiner* — Julian B Getachew
(74) *Attorney, Agent, or Firm* — Shuttleworth & Ingersoll, PLC; Timothy Klima

(57) ABSTRACT

The present invention describes a device of a jet engine with at least one component arranged in a casing and designed rotatable relative to said casing. At least one air-oil volume flow can be passed out of an area of the jet engine into the casing. In accordance with the invention the air-oil volume flow can be introduced into the casing via an introducing facility at least approximately tangentially to an area of the rotatable component close to at least an outer circumferential area.

15 Claims, 5 Drawing Sheets

Figure 1A:
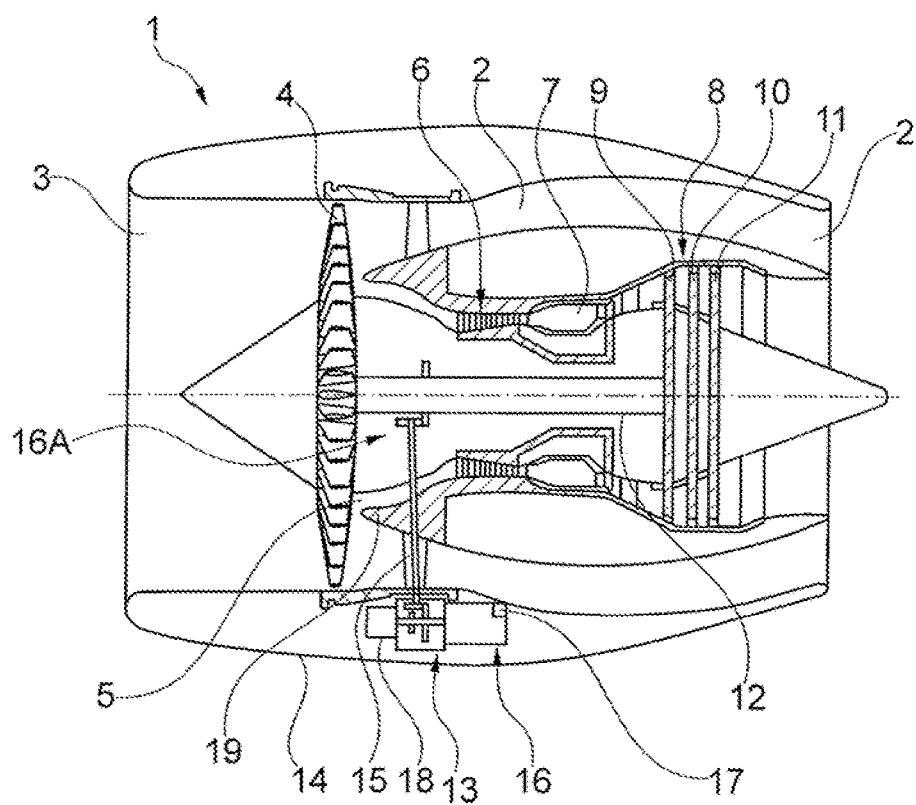

(51) Int. Cl.
 *F16N 7/32* (2006.01)
 *B01D 45/12* (2006.01)

(56) References Cited

U.S. PATENT DOCUMENTS

| | | | |
|---|---|---|---|
| 5,776,229 A | 7/1998 | Blanes et al. | |
| 6,893,478 B2 | 5/2005 | Care et al. | |
| 7,935,164 B2* | 5/2011 | Fang | B01D 45/14 |
| | | | 55/385.3 |
| 2005/0211093 A1 | 9/2005 | Latulipe et al. | |

FOREIGN PATENT DOCUMENTS

| | | |
|---|---|---|
| DE | 60308574 | 1/2007 |
| DE | 102006058343 | 7/2008 |
| EP | 0780546 A1 | 6/1997 |
| EP | 2559869 | 2/2013 |
| GB | 2135740 A | 9/1984 |

OTHER PUBLICATIONS

German Search Report dated Mar. 5, 2014 from counterpart App No 10 2013 114 638.4.

* cited by examiner

JET ENGINE DEVICE WITH AT LEAST ONE COMPONENT THAT IS ARRANGED IN A CASING AND THAT IS ROTATABLE TO THE CASING

This application claims priority to German Patent Application DE102013114638.4 filed Dec. 20, 2013, the entirety of which is incorporated by reference herein.

This invention relates to a device of a jet engine including at least one component arranged in a casing and being rotatable relative to the casing in accordance with a type defined in more detail below.

In jet engines known from practice, oil-containing consumed air from bearing chambers and from an oil tank is supplied during operation via separate lines to an oil-separating facility from an air-oil volume flow, which facility can be designed as an oil separator, preferably as a centrifugal oil separator, and is also referred to as a breather. The large oil particles are separated from the consumed air or from the air-oil volume flows out of the bearing chambers and the oil tank by a deflection area provided in the area of the breather and acting as a centrifuge. Oil particles with smaller diameters are collected by a metal foam arranged inside the oil separator and are also filtered out of the air in this way. The oil separated by this method is returned to the oil circuit of a jet engine. The cleaned air is discharged into the environment of a jet engine.

The air-oil volume flows supplied to the breather or centrifugal oil separator are heavily oiled and have a high temperature. As a result, there are also very fine oil particles in the air-oil volume flows. Due to their small size, these particles are only insufficiently separated by means of the centrifuge and only inadequately retained by the metal foam located inside the centrifuge. As a result, they pass via an outlet of the oil separator for the airflow out of the engine and into the environment in the form of a fine mist. These high oil losses are the main reason for the average oil consumption of current engines.

In addition, undesirably high pressure losses occur in the area of these breathers, further impairing the separation capacity of oil from an air-oil volume flow passed through the breather.

A gas-turbine oil separator with a casing is known from DE 10 2006 058 343 A1, said casing being provided with an inlet. A filter element that can be set to rotate is arranged in the casing and is provided with an air outlet downstream of the filter element. Furthermore, the casing includes at least one oil outlet. Means for applying electrostatic forces are arranged upstream of the filter element in order to increase the tendency of oil drops to combine with an oil film in the filter element, and to improve a separation capacity in the area of the gas-turbine oil separator.

A temperature of an air-oil volume flow introduced into such gas-turbine oil separators, also referred to as breathers, might be very high, which is disadvantageous. Electrostatic charging of an air-oil mixture known from the state of the art is only of limited suitability for improving a separation capacity in the area of a gas-turbine oil separator, since the oil present in gaseous form in the air-oil volume flow cannot be separated to the required extent out of the air-oil volume flow using the known procedure.

Moreover, a gas-turbine machine is known from U.S. Pat. No. 4,525,995 in which several bearing devices of the machine are arranged in bearing chambers. Oil is extracted from the bearing chambers by air flowing through the bearing chambers, so that air-oil volume flows are passed out of the bearing chambers in the direction of an oil separator provided in the area of an accessory gearbox. In the area of the oil separator, the oil is separated from the air-oil volume flows and the air is discharged in the direction of a low-pressure area of the machine, while the separated oil is guided in the direction of an inlet of an extraction pump. The air-oil volume flows each passing from the bearing chambers in the direction of the oil separator are introduced in areas separated from the interior of the accessory gearbox, past said interior and directly into the oil separator, possibly also at high temperature, for which reason the oil present in gaseous form in the air-oil volume flow supplied to the oil separator cannot be separated either to the required extent from the air-oil volume flow in the area of the oil separator.

The object underlying the present invention is to provide a device, by which an oil content of an air-volume flow discharged to the environment from a jet engine can be set as low as possible in a simply designed and cost-effective manner.

It is a particular object to provide a solution to the above problems by a device having features as disclosed herein.

The device in accordance with the invention of a jet engine includes at least one component arranged inside a casing and designed rotatable relative to said casing. At least one air-oil volume flow can be passed out of an area of the jet engine and into the casing.

In accordance with the invention, the air-oil volume flow can be introduced into the casing via an introducing facility at least approximately tangentially to an area of the rotatable component close to at least an outer circumferential area.

In the device in accordance with the invention, the air-oil volume flow introduced into the casing tangentially to the preferably fast-rotating component is accelerated by the rotary movement of the component in the area of the component and flows onto an adjacent inner wall of the casing of the device. Due to the flow onto the casing inner wall, separation of oil droplets contained in the air-oil volume flow, of which the separation affinity on a casing inner wall of the device is rather low due to the droplet size, is favoured or assisted at the inner wall of the casing of the device to a degree necessary for a required high separation capacity. This effect is achieved particularly when the air-oil volume flow is introduced in such a way relative to the rotating component of the device that the air-oil volume flow is passed at an appropriate velocity, to the greatest possible extent by the rotating component, in the direction of the inner wall of the casing.

The device in accordance with the invention can for example be designed as an accessory gearbox of a jet engine, provided with a casing and a gear shaft rotatably mounted in the casing and on which at least one gear is arranged as a rotatable component. It is then advantageous when the air-oil volume flow is introduced into the casing tangentially to the outer circumferential area of the gear in which the toothing is provided, and is accelerated by the moving teeth.

Additionally, it can also be provided that in the area of the device a facility for spraying oil into the air-oil volume flow is provided, using which preferably a defined oil spray jet can be introduced directly into the air-oil volume flow in the area of the rotatable component inside the device. Both the oil droplets of the air-oil volume flow and the oil droplets sprayed into the air-oil volume flow are then accelerated by the rotatable component. In addition to improved separation of oil from the air-oil volume flow, the rotating component additionally favours a high degree of mixing as required between the air-oil volume flow, introduced tangentially to the rotatable component into the interior of the casing of the device in accordance with the invention, and the oil sprayed into the said air-oil volume flow.

When sprayed-in oil droplets meet oil droplets already present in the air-oil volume flow, the sprayed-in oil drops and the already present oil droplets combine due to their forces of attraction to form larger oil drops, which is desirable, said drops being mechanically separable from the air in the further flow path of the air-oil volume flow with less effort than oil particles of smaller diameter. This effect is enhanced even further by the component-related acceleration of the air-oil volume flow and by the high degree of mixing of the air-oil volume flow with the sprayed-in oil.

Additionally, by spraying oil into the air-oil volume flow, a temperature of the air-oil volume flow in the casing of the device in accordance with the invention can be reduced when there is a suitable temperature difference between the oil and the air-oil volume flow. With appropriate cooling of the air-oil volume flow, the desired increase in the oil particle diameters in the air-oil volume flow is additionally favoured, since gaseous oil condenses due to the temperature drop in the air-oil volume flow and leads to an increase in the drop diameters of the oil particles present in the area of the air-oil volume flow.

Separation of oil droplets contained in the air-oil volume flow at an inner wall of the casing of the device, and mixing of the air-oil volume flow and of the sprayed-in oil, are achieved in a simple design and to the required extent when a flow direction at least approximately corresponding substantially to the rotary movement of the rotatable component can be imparted to the air-oil volume flow in the area of the introducing facility.

Depending on the application in question, a flow direction substantially at least approximately opposite to the rotary movement of the rotatable component can be imparted to the air-oil volume flow in the area of the introducing facility.

If a flow direction that forms with the main flow direction of the air-oil volume flow an acute angle and/or an obtuse angle, preferably in the area of the rotatable component, can be imparted to the oil sprayable out of the facility into the air-oil volume flow in the area of said facility, the separation capacity of oil from the air-oil volume flow in the area of the inner wall of the casing of the device and preferably in the area of an oil separator can be improved with minor design effort.

If the facility is designed with a nozzle device in the area of which the oil to be sprayed into the air-oil volume flow is preferably atomizable, the oil can be introduced or sprayed into the air-oil volume flow with droplet diameters that favour a high separation capacity.

A further embodiment of the device in accordance with the invention includes an oil-separating facility, for example an oil separator, from an air-oil volume flow having a separator casing designed with an inlet area for the air-oil volume flow, with an outlet area for air and with an outlet area for oil separated from the air-oil volume flow.

In a development of the device according to the invention, blades running substantially in the radial direction and rotatable about a rotary axis perpendicular to a cross-sectional plane of the inlet area are arranged in said inlet area and in their rotating state apply pressure to an area in the interior of the casing arranged downstream of said blades relative to the inlet area.

The device in accordance with the invention is thus designed in the area of the oil-separating facility with a type of axial-flow pump in the intake/inlet area of the facility, in order to compensate for pressure losses over the flow path of the air-oil volume flow between the inlet area for the air-oil volume flow and the outlet area for air, said pump being used to convey oil-containing consumed air into the interior of the separator casing of the facility and to improve in a simple design and in a space-saving way a separation capacity for oil from the air-oil volume flow passing through the facility out of the interior of the device.

If the blades form at least approximately an impeller, the area in the interior of the separator casing downstream of the blades can be subjected to pressure in a simple design with a favourable ratio between a component weight and a component strength.

The blades are, in a likewise simply designed embodiment of the device in accordance with the invention that can be manufactured with a high strength as required, connected at one end to a hub area in an inner diameter area of the separator casing and at the other end to the separator casing in an outer diameter area of said separator casing, where both the hub area and the separator casing can be set in rotation jointly with the blades.

Oil separated in the area of the facility for separating oil from the air-oil volume flow, can be passed out of said facility with a low design effort if the outlet area for the oil separated from the air-oil volume flow has holes in a radially outer area of the separator casing of the facility. The separated oil can then be discharged by the centrifugal force acting during rotation of the separator casing in a simple manner radially outwards from the interior of the separator casing via the holes out of the interior of the oil-separating facility without further measures.

Depending on the application in question, it is also possible to design the device with means for applying electrostatic forces known from DE 10 2006 058 343 A1 in order to further improve the separation capacity of the device or of the oil separator.

In an advantageous embodiment of the device or of the accessory gearbox, the oil-separating facility is arranged at least partially inside and/or outside of the casing, where the arrangement of the oil-separating facility inside the casing of the device or of the accessory gearbox represents additional protection for said facility, while an arrangement of the facility outside the casing of the device or of the accessory gearbox might not require any design changes in the area of the casing of the device or of a conventional accessory gearbox.

In a particularly space-saving embodiment of the device or of the accessory gearbox, the oil-separating facility is arranged on a shaft or gear shaft and preferably integrated into a gear arranged on the gear shaft. Then the separator casing and the blades, and preferably the porous area of the oil-separating facility, can be directly rotationally driven to the required extent by the shaft. Depending on the application in question, it is however also possible to provide, between the separator casing and the blades and preferably the porous area and the shaft/gear shaft, an appropriate transmission to cause the separator casing and the blades and preferably the porous area of the oil-separating facility to rotate at a speed different from the speed of the shaft/gear shaft.

The outlet area for air of the oil-separating facility includes in a particularly space-saving embodiment of the device or of the accessory gearbox at least one passage opening passing through the shaft/gear shaft designed as a hollow shaft, so that the cleaned air in the area of the oil-separating facility can be passed out of said facility without additional measures.

Oil separated in the area of the facility for separating oil from the air-oil volume flow can also be passed out of said oil-separating facility with a low design effort into the interior of the device in accordance with the invention or of the accessory gearbox, when the holes in the outlet area for the oil separated from the air-oil volume flow connect the interior of the oil-separating facility to the interior of the casing of the device or of the accessory gearbox.

In an embodiment of the oil-separating facility of the device in accordance with the invention and operable with a high separation capacity, said facility is provided in the separator casing downstream of the blades with a porous area that can be set in rotation and is arranged in the flow path of the air-oil volume flow and can be flowed through by the air-oil volume flow.

Upstream of the porous area, a deflection area is provided in the flow path of the air-oil volume flow in a simply designed embodiment of the oil-separating facility in the device in accordance with the invention, in which deflection area at least part of the oil can be separated from the air-oil volume flow due to the active centrifugal force. As a result, larger oil particles or oil droplets can already be separated in a simply designed manner from the air-oil volume flow before entering the porous area of the facility, and a flow resistance in the porous area of the facility due to too high an oil load can be limited to a defined level.

Since the device or accessory gearbox is designed with the oil-separating facility as described above in more detail, the oil can be separated in a simple manner and to the required extent from an air-oil volume flow loaded with oil and to be passed out of the device or of the accessory gearbox.

The separation capacity in the area of the oil-separating facility is additionally increased, in comparison to solutions known from the state of the art, in a simply designed manner in that the air-oil volume flow out of an interior of the casing of the device or of the accessory gearbox, in which rotating components such as gears, bearing devices and the like can be supplied with lubricating and cooling oil preferably via a lubrication and cooling circuit, is introducible into the facility at an operating temperature favouring a high separation capacity, and the air is dischargeable via the air outlet preferably in the direction of the environment of the device or of the accessory gearbox and the oil via the oil outlet out of the facility and preferably back into the accessory gearbox. It is possible here, to discharge the cleaned air downstream of the oil-separating facility or of the oil separator to the environment of the jet engine or to an engine core or, bypass flow, while the separated oil is returned to an oil circuit of the jet engine.

An oil content of an air-oil volume flow discharged from a jet engine to the environment is kept as low as possible with little effort if the jet engine is designed with a device in accordance with the invention or with an accessory gearbox such as described in more detail above.

In an advantageous embodiment of a jet engine, several areas supplied with oil are in an operative connection with the oil-separating facility via the interior of the casing of the device or of the accessory gearbox. As a result, the separation capacity in particular is increased in a simply designed manner in the area of the facility in comparison to solutions known from the state of the art. This results from the fact that the air-oil volume flow from the area supplied with oil via the interior—in which rotating components such as gears, bearing devices and the like can be supplied with lubricating and cooling oil preferably via a lubrication and cooling circuit—of the casing of the accessory gearbox can be introduced into the oil-separating facility and the air can be discharged via the air outlet and the oil via the oil outlet out of the oil-separating facility.

By introducing the air-oil volume flow out of the area of the jet engine supplied with oil into the interior of the casing of the device or of the accessory gearbox, a temperature of the air-oil volume flow can be reduced in simple manner when there is a suitable temperature difference between the interior of the casing of the device or of the accessory gearbox and the air-oil volume flow. With appropriate cooling of the air-oil volume flow, oil present therein in gaseous form condenses, favouring an increase in the drop diameters of the oil particles present in the area of the air-oil volume flow. Additionally, the oil droplets present in the air-oil volume flow combine, when meeting oil droplets already present in the interior of the casing of the device or of the accessory gearbox due to the prevailing attraction forces, to form larger drops as required, which in the further flow path of the air-oil volume flow can be mechanically separated from the air with less effort than oil particles with a smaller diameter. It is then possible to discharge the cleaned air downstream of the device to the environment of the jet engine or to an engine core or bypass flow, while the separated oil can be returned via the oil outlet of the oil-separating facility into the interior of the device or of the accessory gearbox and from there preferably into an oil circuit of the jet engine.

The increase in the drop diameter previously described and effected by introducing the air-oil volume flow from the at least one area supplied with oil into the interior of the casing of the device or of the accessory gearbox also leads to an improvement in the separation capacity in the porous area of the oil-separating facility, in which the oil present in the air-oil volume flow is separated from the air-oil volume flow on the one hand as in the area of an impingement filter and on the other hand as in the area of a centrifuge. The enlarged oil particles of the air-oil volume flow in the area of the interior of the casing of the device or of the accessory gearbox can be separated more efficiently and with less effort in the porous area, which can be designed preferably as a metal foam or the like. As a result, the oil losses occurring via the exhaust air of a jet engine are lower due to the reduced emissions.

In a further advantageous embodiment of the jet engine, an area supplied with oil is a bearing chamber and/or an oil tank, with which oil discharged from these areas by an airflow can be separated from said airflow to the previously described extent with a high separation capacity and returned with minor effort to an oil circuit of a jet engine.

Both the features stated in the patent Claims and the features stated in the following exemplary embodiments of the device in accordance with the invention, of the accessory gearbox in accordance with the invention and of the jet engine in accordance with the invention, are each suitable, singly or in any combination with one another, to develop the subject matter of the invention. The respective feature combinations do not represent any restriction with regard to the development of the subject matter in accordance with the invention, but have substantially only exemplary character.

Further advantages and advantageous embodiments of the device in accordance with the invention, of the accessory gearbox in accordance with the invention and of the jet engine in accordance with the invention, become apparent from the patent Claims and the exemplary embodiments described in principle in the following with reference to the accompanying drawing, where the same reference numerals are used for components of identical design and function for greater clarity.

IN THE DRAWING

Figure 1B:
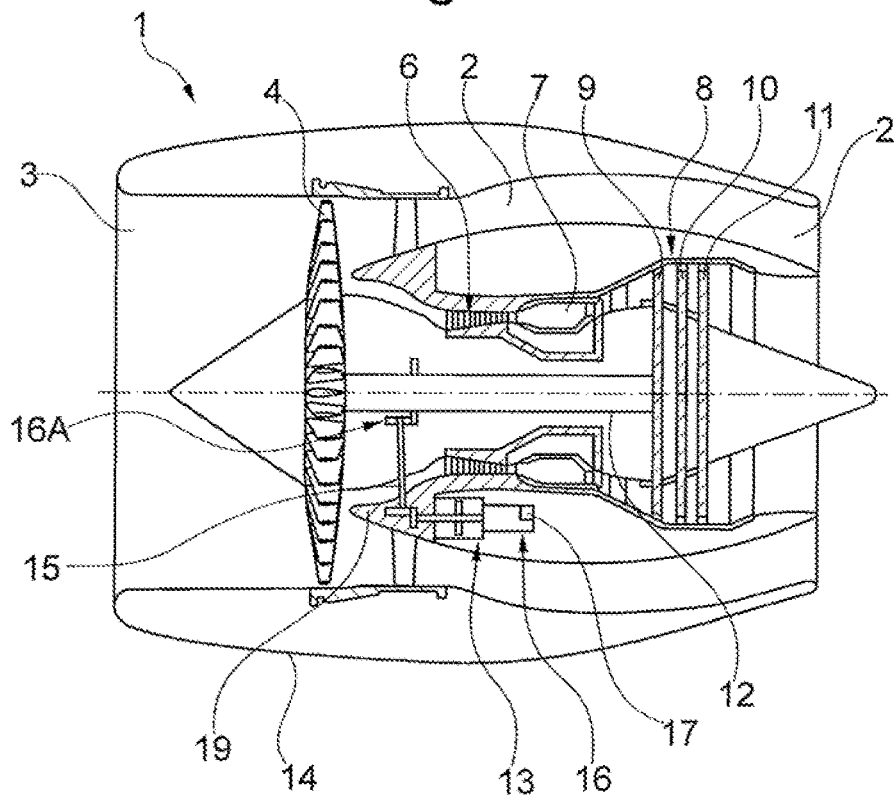
Figure 2:
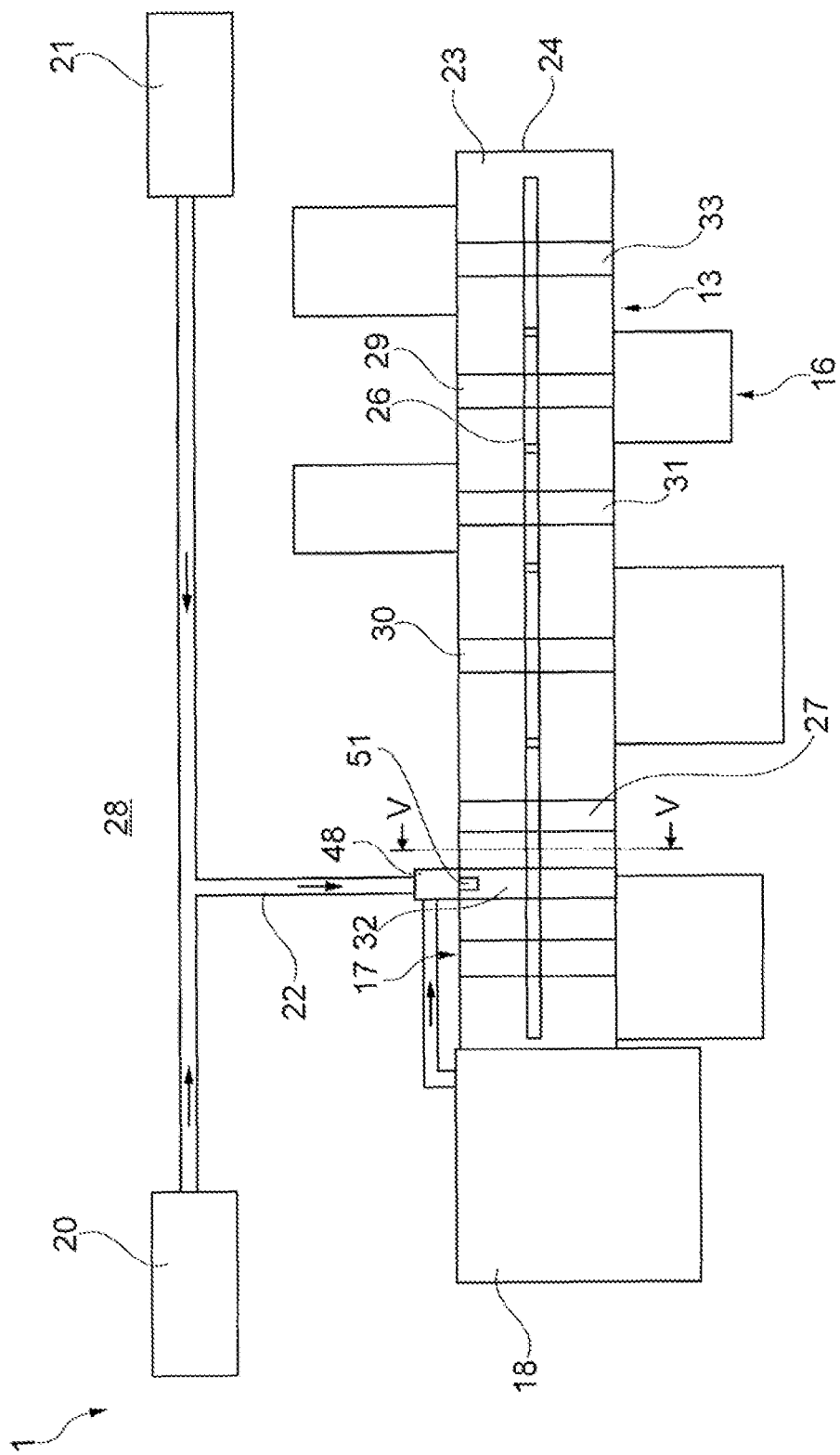
Figure 3:
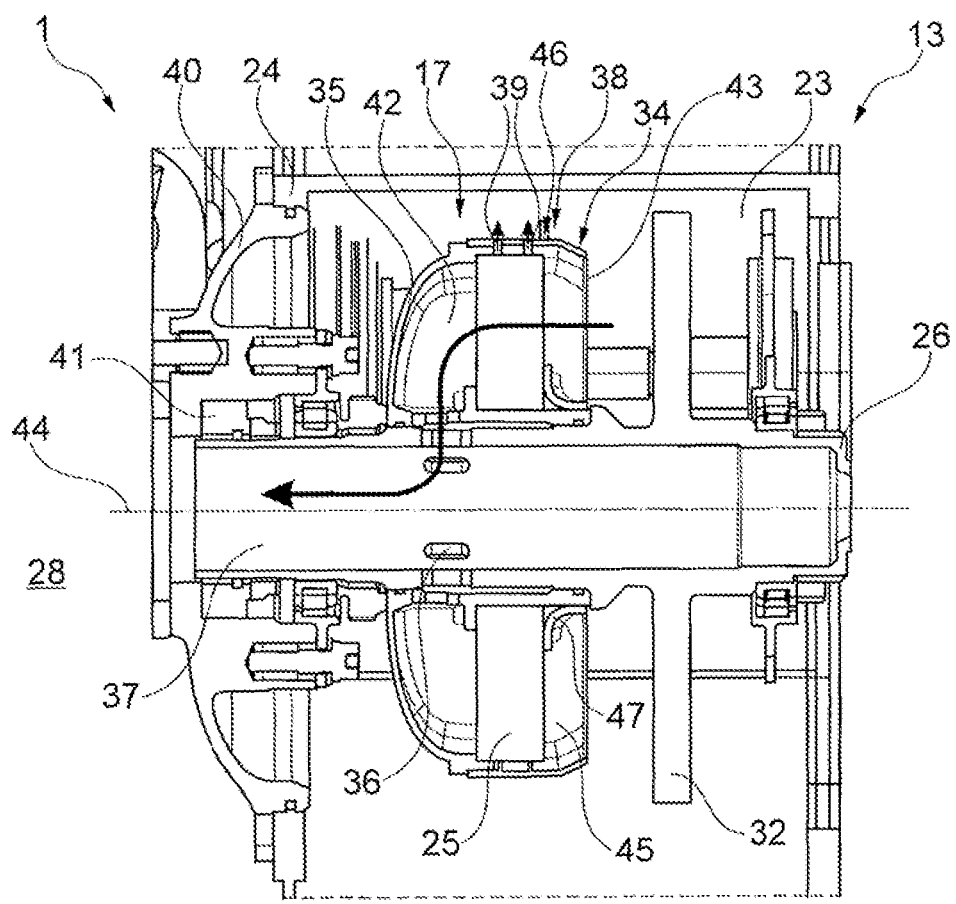
Figure 4:
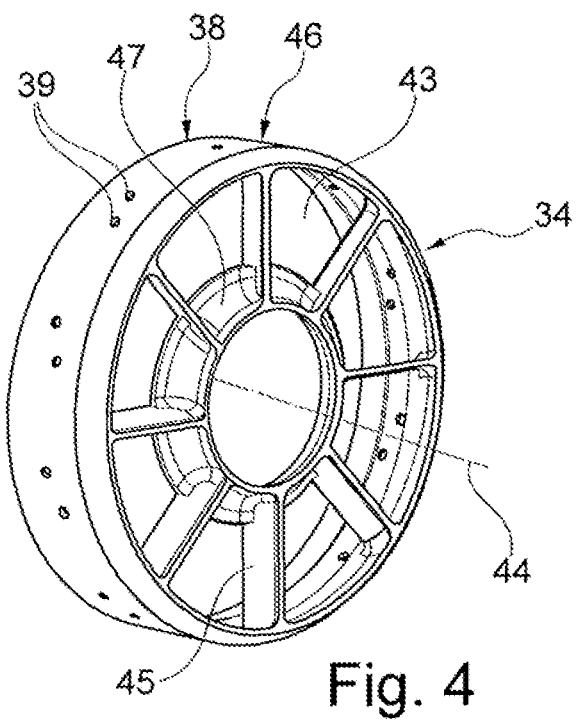
Figure 5:
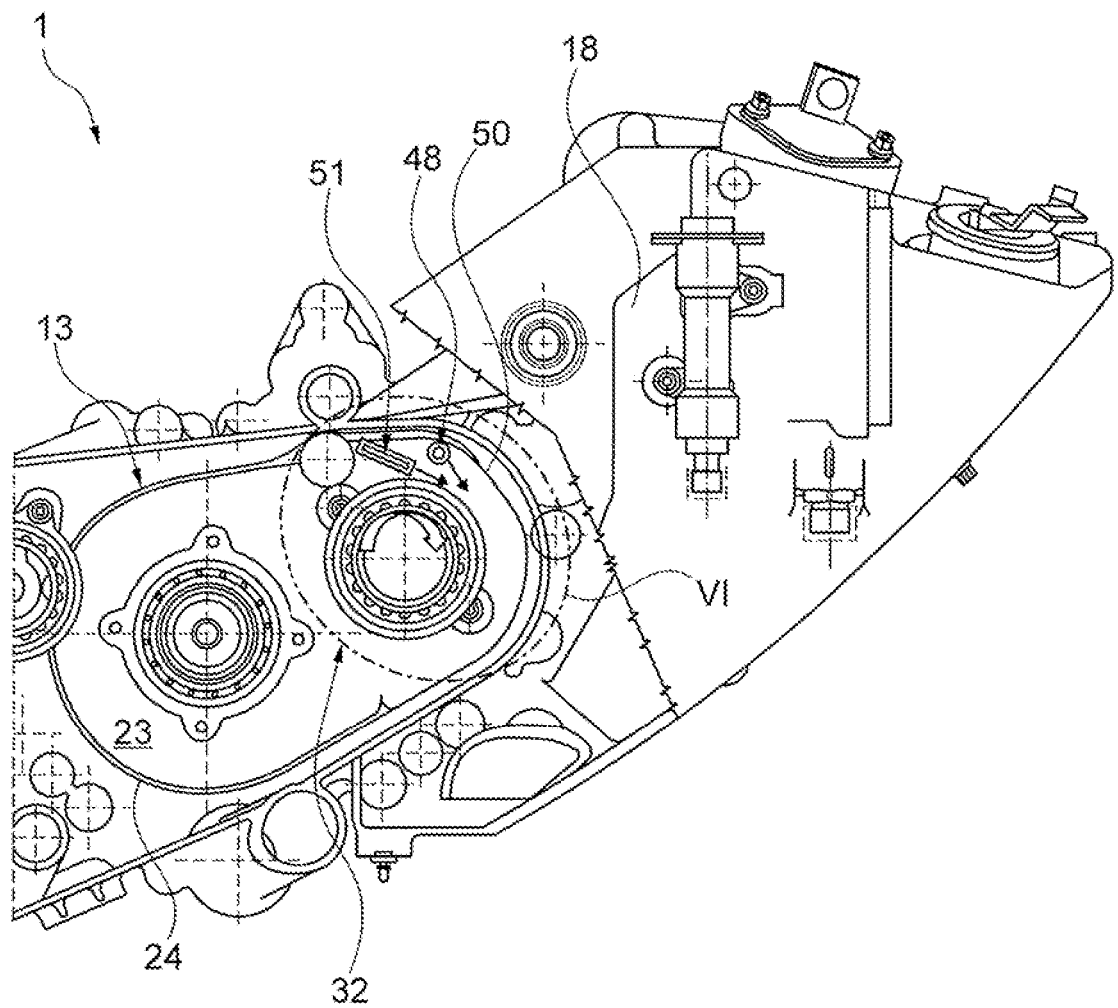
Figure 6:
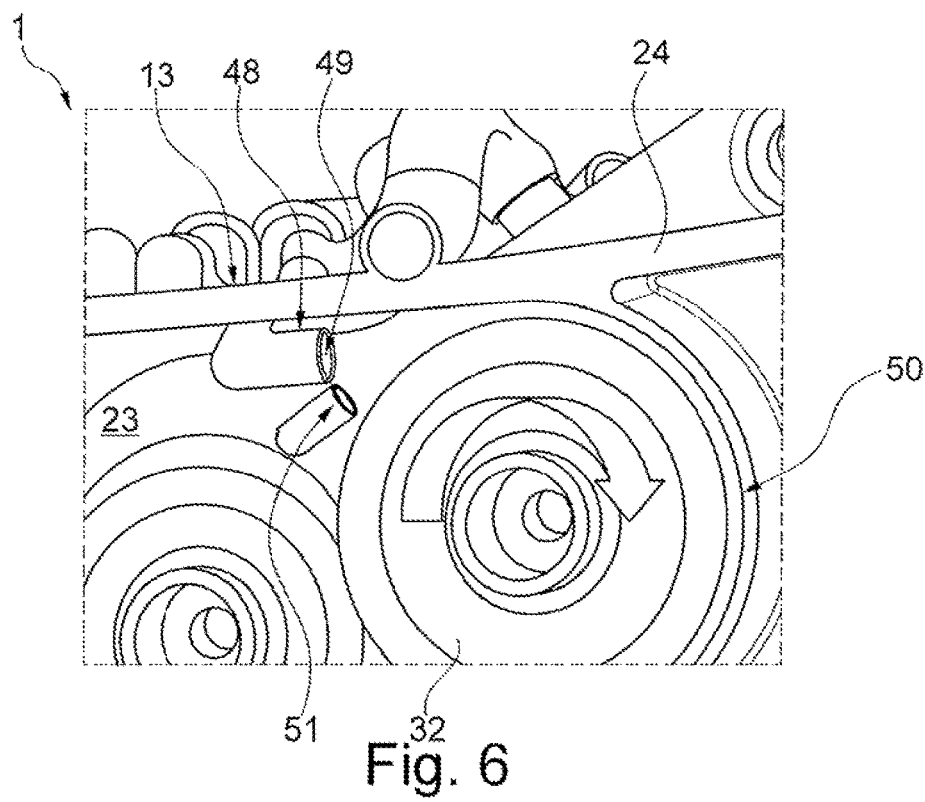
Figure 7:
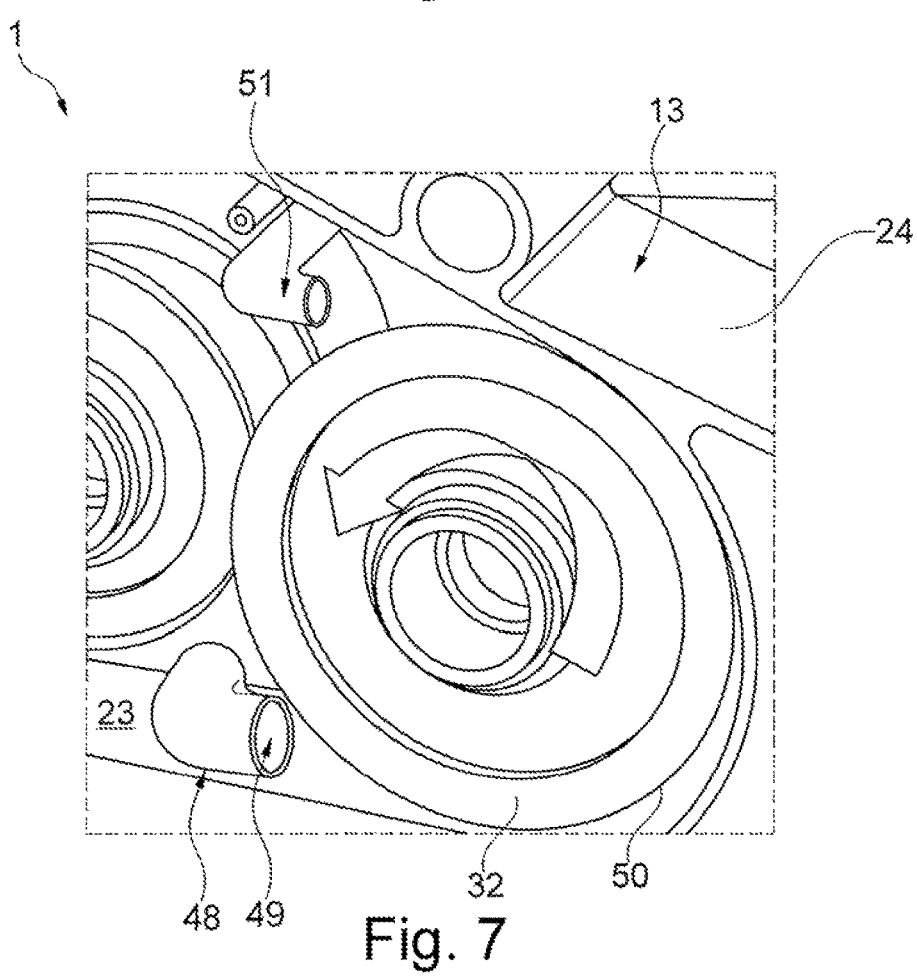

FIG. 1a shows a highly schematized longitudinal sectional view of a jet engine with an accessory gearbox arranged in the fan casing, FIG. 1b shows a representation—corresponding to FIG. 1a—of a jet engine with an accessory gearbox mounted in the area of the engine core, FIG. 2 shows a highly schematized representation of a partial area of the jet engine according to FIG. 1a or FIG. 1b including the accessory gearbox in an embodiment of the device in accordance with the present invention, FIG. 3 shows an enlarged representation of an area of the accessory gearbox in accordance with FIG. 2, FIG. 4 shows a schematized three-dimensional detailed representation of an intake area of the device according to FIG. 2 and FIG. 3, FIG. 5 shows a cross-sectional view of an area of the jet engine according to FIG. 1a or FIG. 1b respectively, along a sectional line V-V shown in FIG. 4 through the accessory gearbox, FIG. 6 shows an enlarged view of an area VI illustrated in more detail in FIG. 5, and FIG. 7 shows a representation, corresponding to FIG. 6, of a further embodiment of the device in accordance with the present invention.

FIGS. 1a and 1b each show a jet engine 1 in a longitudinal sectional view. The jet engine 1 is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The turbine device 8 has in the present invention three rotor devices 9, 10 and 11, which have a substantially comparable design and are connected to an engine axis 12.

In the design of the jet engine 1 according to FIG. 1a, a device 13 designed in the present invention as accessory gearbox is arranged in an outer engine casing 14, delimiting the bypass duct 2 and representing the outer circumferential area of the jet engine 1. The accessory gearbox 13 in the present invention is connected via a drive shaft 15 running in the radial direction of the jet engine 1 and via an inner gearbox 16A to the engine axis 12 and is thus driven/subjected to torque by the engine axis 12 during operation of the jet engine 1. Various auxiliary units 16 and a device 17 for separating oil or an oil separator, which is also referred to as breather, are subjected to torque to the required extent by the accessory gearbox 13. Additionally, an oil tank 18 is provided in the area of the accessory gearbox 13, which represents a hydraulic fluid reservoir, from which oil is tapped for cooling and lubricating various areas of the jet engine 1 such as bearing devices, gear pairings of the inner gearbox 16A and of the accessory gearbox 13, and further assemblies of the jet engine 1 that are to be cooled and lubricated.

In contrast to this, the accessory gearbox 13 with the auxiliary units 16 and the oil separator 17 is arranged, in the design of the jet engine 1 according to FIG. 1b, in the radial direction between the bypass duct 2 and the engine core 5 in a component 19 delimiting both the bypass duct 2 and the engine core 5.

FIG. 2 to FIG. 7 each show areas of the jet engine 1 according to FIG. 1a and FIG. 1b respectively, in which are arranged the accessory gearbox 13, the auxiliary units 16 and the oil separator 17. The oil separator 17 is in operative connection, in a manner described in more detail below, to the oil tank 18 and to two further areas 20, 21 of the jet engine 1 designed as bearing chambers of the jet engine 1 and supplied with oil from the oil tank 18 for lubrication and cooling during operation of the jet engine 1. The area 20 represents here the bearing chamber of the front bearing, and the area 21 the bearing chamber of the rear bearing of the jet engine 1.

From both the front bearing chamber 20 and the rear bearing chamber 21, an air-oil volume flow can be routed in the direction of a line section 22, which in the present invention issues into an interior 23 of a casing 24 of the accessory gearbox 13. Furthermore, the oil tank 18 too is connected to the interior 23 of the casing 24 of the accessory gearbox 13 in order to allow an air-oil volume flow from the oil tank 18 additionally to be introduced into the interior 23.

The interior 23 of the casing 24 of the accessory gearbox 13 is in turn connected via an inlet area 34 of a separator casing or of a casing 46 of the oil separator 17 to an interior 42 of the oil separator 17, where an air-oil volume flow is introduced into the interior 42 of the oil separator 17 out of the casing 24 of the accessory gearbox 13 when the interior 23 of the accessory gearbox 13 is subjected to appropriate pressure. A porous area 25, rotatable with the casing 46 of the oil separator 17, is arranged inside the interior 42 of the oil separator 17 and can be subjected to and flowed through by the air-oil volume flow flowing from the interior 23 of the casing 24 of the accessory gearbox 13 into the interior 42 of the oil separator 17.

The oil separator 17 is in the present invention operatively connected to a gear shaft 26 of the accessory gearbox 13 and can be rotationally driven by said shaft. Additionally to the oil separator 17, gears 27 and 29 to 33 are arranged on the gear shaft 26, by which a torque can be passed on in the direction of the auxiliary units 16 by the gear shaft 26 for driving said auxiliary units 16. Furthermore, the oil separator 17 is provided next to a component 40 of the casing 24 designed as a casing cover, which by means of a sealing unit 41 seals the interior 23 of the accessory gearbox 13 from the environment 28. The gear 32 of the accessory gearbox 13 is provided on that side of the oil separator 17 facing away from the component 40.

The porous area 25 of the oil separator 17 that can likewise be set in rotation by the gear shaft 26 acts as a centrifuge in order to reduce as much as possible the proportion of the oil in the air-oil volume flow flowing through the porous area 25. Here, the oil content of the air-oil volume flow in the oil separator 17 in the zone of the porous area 25 is reduced by separation of the oil from the air, on the one hand in the same way as during flowing through an impingement filter and on the other hand as in the area of a centrifuge, due to the rotation of the porous area 25. The oil ejected in the zone of the porous area 25 is discharged, via an oil outlet 39 of the oil separator 17 including holes provided in a radially outer area 38 of the casing 46 of the oil separator 17 and connecting the interior 42 of the oil separator 17 to the interior 23 of the casing 24 of the accessory gearbox 13, in the direction of the interior 23 of the accessory gearbox 13 and from there pumped back into the oil tank 18.

The cleaned airflow is diverted downstream of the porous area 25 by a deflection area 35 of the oil separator 17 and introduced into an interior 37 of the gear shaft 26 via passage openings 36, which pass through said gear shaft 26 designed as a hollow shaft and form the air outlet of the oil separator 17. Then the air is discharged from there in the direction of the environment 28. The air flowing out of the oil separator 17 in the direction of an environment 28 of the accessory gearbox 13 has only a low oil load.

Since the air-oil volume flows of the bearing chambers 20 and 21 and of the oil tank 18 are introduced into the interior 23 of the casing 24 of the accessory gearbox 13, the oil load of the air-oil volume flow flowing out of the oil separator 17 and in the direction of the environment 28 is kept low in a simple manner. This results from the fact that the air-oil volume flows out of the bearing chambers 20 and 21 and out of the oil tank 18 are initially cooled in the interior 23 of the accessory gearbox 13 to the oil temperature in said accessory gearbox 13 due to the heavily oiled environment inside it. The condensation resulting from cooling of the air-oil volume flows of oil held in gaseous form in said air-oil volume flows leads to a rise in the diameters of the oil particles present in the air-oil volume flows, which are in any event larger than oil drops which cannot be filtered out in the porous area 25 due to their small size.

The diameters of the smaller droplets present in the air-oil volume flows out of the bearing chambers 20 and 21 and out of the oil tank 18 increase due to their introduction into the interior 23 of the accessory gearbox 13 and also due to their combination with further oil droplets in the air in the interior 24 of the accessory gearbox 13, said increase being favoured by the respectively prevailing attraction forces between the individual oil droplets in the air-oil volume flows and the oil droplets present in the air in the interior of the accessory gearbox 13. The now enlarged oil particles in the entire air-oil volume flow occurring due to the washing out of the oil in the area of the interior 23 of the accessory gearbox 13 can be separated substantially more efficiently by the porous area 25 or the metal foam in the breather 17, so that oil losses of the jet engine 1 are minimized due to reduced emissions in the direction of the environment 28.

Additionally, blades 45 shown in more detail in FIG. 4 and running substantially in the radial direction and rotatable about a rotary axis 44 perpendicular to a cross-sectional plane 43 of the inlet area 34, which in the present invention is perpendicular to the drawing plane, are arranged in the inlet area 34 of the oil separator 17. Pressure is applied by the blades 45 in their rotating state to a flow area arranged in the interior 42 of the oil separator 17 downstream of said blades 45 relative to the inlet area 34. The blades 45 are connected at one end in an inner diameter area of the casing 46 to a hub area 47 and at the other end in an outer diameter area of the casing 46 to said casing 46. The hub area 47 of the casing 46 can be set in rotation jointly with the outer diameter area of the casing 46 and the blades 45 by the gear shaft 26.

The casing 46, the blades 45 and the hub area 47 form at least approximately an impeller by which the air-oil volume flow passing out of the interior 23 of the accessory gearbox 13 into the interior 42 of the oil separator 17 is blown in for an at least approximate compensation of a pressure drop occurring during flow through the porous area 25. To apply pressure to the interior 42 to the required extent using the blades 45, said blades 45 are designed both in the radial direction and in the flow direction of the air-oil volume flow with a cross-sectional design favourable for that purpose.

Due to the pressure applied to the accessory gearbox 13, it is possible in simple manner to use in the area of the accessory gearbox 13 and of the oil separator 17 pressure-dependent seals, e.g. lip seals or the like. Additionally, the jet engine 1 can, due to the introduction of the air-oil volume flows from the bearing chambers 20 and 21 and from the oil tank 18 into the interior 23 of the accessory gearbox 13, be designed with lower line lengths in the area of the air supply lines. Oil separation in the area of the device 17 is further improved with a low design effort, in addition to optimized oil separation in the area of the oil separator 17, by pre-cooling of the air in the area of the accessory gearbox 13.

FIG. 5 shows a cross-sectional view through the accessory gearbox 13 along a sectional line V-V shown in more detail in FIG. 4. From the illustration according to FIG. 5, it can be seen that both the air-oil volume flow out of the bearing chambers 20 and 21 and the air-oil volume flow out of the oil tank 18 are introduced using an introducing facility 48 into the casing 24 of the accessory gearbox at least approximately tangentially to an area of the gear 32 close to at least an outer circumferential area. Here, a flow direction at least approximately corresponding substantially to the rotary movement of the rotatable component or gear 32 is imparted to the air-oil volume flow in the area of the introducing facility 48. Said introducing facility 48 includes a tubular outlet 49 shown in more detail in FIG. 6 and FIG. 7 respectively, from which outlet the air-oil volume flow flows out tangentially to the gear 32, which in the present invention is designed as a spur gear.

In the area of the gear 32 rapidly rotating during operation of the accessory gearbox 13, the air-oil volume flow introduced into the casing 23 of the accessory gearbox 13 is accelerated and flows onto an inner wall 50 of the casing 23. Due to the flow onto the inner wall 50 forced by the gear 32, oil droplets present in the air-oil volume flow are separated to a greater extent at the inner wall 50 of the casing 23 of the accessory gearbox, said droplets due to their small size separating only to a lesser extent at the inner wall 50 of the casing 23 of the accessory gearbox 13 without the forced onflow.

In order to enhance the separation process—improved by the forced onflow—of oil droplets present in the air-oil volume flow with small droplet diameters, the device 13 is additionally designed in the area of the gear 32 with a facility 51 for spraying oil into the air-oil volume flow flowing out of the introducing facility 48 and into the interior 24 of the accessory gearbox 13. Here, the oil is sprayed into the air-oil volume flow with droplet diameters such that the small droplets in the air-oil volume flow combine with the sprayed-in oil droplets to form larger oil droplets. These larger oil droplets in turn separate to a greater extent at the inner wall 50. Additionally, the larger oil droplets in the area of the oil separator 17 can be better separated from the air-oil volume flow to be passed out of the accessory gearbox 13.

In the first exemplary embodiment of the device 13 or of the accessory gearbox shown in FIG. 6, a flow direction at least approximately corresponding substantially to the rotary movement of the gear 32 is imparted to the air-oil volume flow in the area of the introducing facility 48, while a flow direction is imparted to the oil sprayable out of the facility 51 into the air-oil volume flow in the area of the facility 51 that forms an acute angle with the main flow direction of the air-oil volume flow in the area of the rotatable component, so that the oil also has a flow direction at least approximately corresponding substantially to the rotary movement of the gear 32. The oil is sprayed, in the installation position of the accessory gearbox 13 underneath the air-oil volume flow, into the air-oil volume flow before said air-oil volume flow is seized together with the sprayed-in oil by the rotating gear 32 to the full extent and then accelerated and mixed.

In contrast to this, the oil in the second embodiment of the device 13, as shown in FIG. 7, is sprayed into the interior 23 of the accessory gearbox 13 against the direction of rotation of the gear 32 at least approximately tangentially to the outer circumference of the gear 32, accelerated by said gear 32 in the direction of rotation of said gear 32 and mixed to the required extent with the air-oil volume flow introduced in the flow direction of the gear 32 and tangentially to said gear 32, and then flows to the previously described extent onto the inner wall 50 of the casing 23 of the accessory gearbox 13.

Depending on the application in question, in particular depending on the installation space available in each case inside the casing 24 of the accessory gearbox 13 or of the device, the air-oil volume flow is introduced into the casing 24 substantially in the direction of rotation of the gear 32, against the direction of rotation of the gear 32 or with an intermediate onflow direction into the interior 23 of the casing 24 of the accessory gearbox 13 and at least approximately tangentially to an area of the rotatable component 32 close to an outer circumferential area. To improve a separation capacity in the area of a casing inner wall 50 of the casing 23 accordingly, a flow direction is imparted to the oil in the area of the facility 51 that forms an acute angle and/or an obtuse angle with the main flow direction of the air-oil volume flow preferably in the area of the rotatable component 32.

If, after the separation of oil droplets in the area of the casing inner wall 50, air loaded with correspondingly larger oil droplets is introduced into the oil separator 17 out of the interior 23 of the casing 24 of the accessory gearbox 13, the remaining and now larger oil particles in the area of the oil separator 17 can be separated more efficiently from the air-oil volume flow.

Generally speaking, the lower oil consumption of the jet engine 1 in comparison with conventionally designed jet engines leads to maintenance intervals of a jet engine being extendable, emissions from a jet engine being reduced and less visible oil mist being caused.

LIST OF REFERENCE NUMERALS

1 Jet engine
2 Bypass duct
3 Intake area
4 Fan
5 Engine core
6 Compressor device
7 Burner
8 Turbine device
9, 10, 11 Rotor device
12 Engine axis
13 Accessory gearbox
14 Engine casing
15 Drive shaft
16 Auxiliary units
16A Inner gearbox
17 Facility, oil separator
18 Oil tank
19 Component
20 Area, front bearing chamber
21 Area, rear bearing chamber
22 Line section
23 Interior
24 Casing
25 Porous area
26 Gear shaft, hollow shaft
27 Gear
28 Environment
29 to 33 Gear
34 Inlet area of oil separator
35 Deflection area of oil separator
36 Passage opening of gear shaft, air outlet of oil separator
37 Interior of gear shaft

The invention claimed is:

1. A device of a jet engine comprising:
a casing;
a component arranged in the casing and being rotatable relative to the casing, the component including an outer circumferential area which rotates around an axis of the component,
a duct for passing an air-oil volume flow from an area of the jet engine into the casing,
an introduction outlet connected to the duct for introducing the air-oil volume flow into the casing in an area of the outer circumferential area in a flow direction tangential to the outer circumferential area and perpendicular to a plane established by the axis of the component and a first point of tangency of the flow direction of the air-oil volume flow with the outer circumferential area;
an oil tank containing and supplying an oil flow that is predominately oil;
an oil outlet connected to the oil tank for receiving the oil flow from the oil tank and spraying the oil flow into the air-oil volume flow in an area of the component, wherein a flow direction of the oil flow from the oil outlet is tangential to the outer circumferential area and perpendicular to a further plane established by the axis of the component and a second point of tangency of the flow direction of the oil flow with the outer circumferential area.

2. The device in accordance with claim 1, wherein the flow direction is in a same direction as a rotating direction of the outer circumferential area.

3. The device in accordance with claim 1, wherein the flow direction is in an opposite direction to a rotating direction of the outer circumferential area.

4. The device in accordance with claim 1, wherein the flow direction of the oil flow from the oil outlet is at an acute angle to the flow direction of the air-oil volume flow.

5. The device in accordance with claim 1, wherein the flow direction of the oil flow from the oil outlet is at an obtuse angle to the flow direction of the air-oil volume flow.

6. The device in accordance with claim 1, wherein the oil outlet includes a nozzle device for atomizing the oil flow.

7. The device in accordance with claim 1, and further comprising a separating facility for separating oil from the air-oil volume flow, the separating facility including a separator casing, an inlet area for the air-oil volume flow, an outlet area for air, and an outlet area for oil separated from the air-oil volume flow.

8. The device in accordance with claim 7, wherein the inlet area includes a plurality of blades running substantially in a radial direction and rotatable about a rotary axis perpendicular to a cross-sectional plane of the inlet area, the plurality of blades applying pressure, in a rotating state, to an area in an interior of the separator casing arranged downstream of the plurality of blades relative to the inlet area.

9. The device in accordance with claim 8, wherein the plurality of blades form an impeller.

10. The device in accordance with claim 8, and further comprising a hub, with the plurality of blades being connected at first ends to the hub in an inner diameter area of the separator casing and at second ends to the separator casing in an outer diameter area of the impeller, where both the hub and the casing are rotatable jointly with the plurality of blades.

11. The device in accordance with claim 7, wherein the outlet area for the oil separated from the air-oil volume flow includes a plurality of holes in a radially outer area of the separator casing.

12. The device in accordance with claim 11, wherein the plurality of holes in the radially outer area of the separator casing connect an interior of the separating facility to an interior of the casing.

13. The device in accordance with claim 7, and further comprising a shaft, with the separating facility being arranged on the shaft.

14. The device in accordance with claim 13, wherein the shaft includes a hollow interior and the outlet area for air separated from the air-oil volume flow includes at least one passage opening passing through the shaft to the hollow interior.

15. The device in accordance with claim 1, wherein the component is a gear of an accessory gearbox of the jet engine.

\* \* \* \* \*